United States Patent [19]

Dufft

[11] Patent Number: 4,566,623
[45] Date of Patent: Jan. 28, 1986

[54] METHOD OF PRODUCING A METAL TUBE AND FLANGE ASSEMBLY

[75] Inventor: Jurgen Dufft, Kenilworth, England

[73] Assignee: Lucas Industries Limited, Birmingham, England

[21] Appl. No.: 624,838

[22] Filed: Jun. 26, 1984

Related U.S. Application Data

[62] Division of Ser. No. 375,192, May 5, 1982, Pat. No. 4,477,010.

[30] Foreign Application Priority Data

May 27, 1981 [GB] United Kingdom ............... 8116113

[51] Int. Cl.$^4$ .......................................... B23K 31/00
[52] U.S. Cl. .................................. 228/138; 228/173.1
[58] Field of Search ............... 228/135, 136, 138, 126, 228/128, 173 A; 219/121 ED; 411/517, 516; 29/453, 450; 403/271, 272, 366, 372; 24/255 BS, 256

[56] References Cited

U.S. PATENT DOCUMENTS

| | | | |
|---|---|---|---|
| 414,194 | 11/1889 | Cottle | 228/154 |
| 2,376,574 | 5/1945 | Collins | 403/271 |
| 2,580,396 | 1/1952 | Bluth | 411/516 |
| 2,965,349 | 12/1960 | Hutton | 29/453 |
| 3,449,818 | 6/1969 | Lowe et al. | 228/263.19 |
| 3,751,792 | 8/1973 | Frakes | 228/170 |
| 4,470,717 | 9/1984 | Bruhuk et al. | 228/136 |
| 4,477,010 | 10/1984 | Dufft | 228/138 |

FOREIGN PATENT DOCUMENTS 340856 1/1931 United Kingdom ............... 403/272

Primary Examiner—Kenneth J. Ramsey
Assistant Examiner—Kurt Rowan
Attorney, Agent, or Firm—Holman & Stern

[57] ABSTRACT

A method of making an assembly of a metal tube and a flange body having an opening therein through which the tube is passed during assembly, comprising, deforming the flange resiliently to enlarge the opening to allow passage of the tube, inserting and passing the tube through the opening to the desired position, and allowing the flange to resiliently recover toward its condition prior to deformation thereby being urged into engagement with the tube at the opening. In another form of the method, the tube opening is large enough to permit passage of the tube and the flange is subsequently deformed inwardly onto the tube. The flange is finally secured to the tube by laser or electron beam welding.

4 Claims, 4 Drawing Figures

METHOD OF PRODUCING A METAL TUBE AND FLANGE ASSEMBLY

This is a divisional of application Ser. No. 375,192 filed May 5, 1982, now U.S. Pat. No. 4,477,010.

BACKGROUND OF THE INVENTION

1. Field of the Invention

This invention relates to a method of producing an assembly comprising a metal tube and a surrounding body and also to such an assembly produced by the method and useful, for example, as the cylinder part of a vehicle hydraulic system master cylinder, the body then being in the form of an outwardly projecting flange serving for the mounting of the assembly on the vehicle.

2. Description of the Prior Art

It is desirable with some such assemblies, as for example the flange and tube assembly referred to above, for the flange to fit intimately around the outer surface of the cylinder. This requirement is not, however, consistent with the necessity for an initial clearance between the flange opening and tube to enable the flange to be placed around the tube prior to being secured thereon. Moreover, the external diameter of the tube is likely to vary by at least 0.005"–0.007" and this also has to be allowed for in the initial sizing of the flange aperture.

BRIEF SUMMARY OF THE INVENTION

According to a first aspect of the invention, a method of producing an assembly comprising a metal tube and a surrounding body comprises forming a body which has an opening therein which, when the body is unstressed, is no larger than the minimum peripheral external dimension of the tube, the body being of such a form as to permit expansion of the opening by resilient deformation of the body, expanding the opening by resilient deformation of the body, passing the tube through the opening to a desired position, releasing the body to permit it to grip the external surface of the tube upon resilient recovery, and securing the body in position by welding.

From another aspect of the invention, a method of producing an assembly comprising a tube and a surrounding body comprises forming a body which has an opening therein which, when the body is unstressed, is large enough to surround with clearance a portion of the external peripheral tube wall to which it is to be secured, the body being such as to permit contraction of the opening by resilient deformation of the body, passing the tube through the opening to a desired position, deforming the body radially inwardly into engagement with said tube wall portion, and securing the body in position by welding.

Preferably, welding is effected in both of the aforesaid aspects of the invention by an electron beam or laser beam welding operation.

BRIEF DESCRIPTION OF THE DRAWINGS

The invention will now be described, by way of example, with reference to the accompanying drawings wherein.

DETAILED DESCRIPTION

Figure 1:
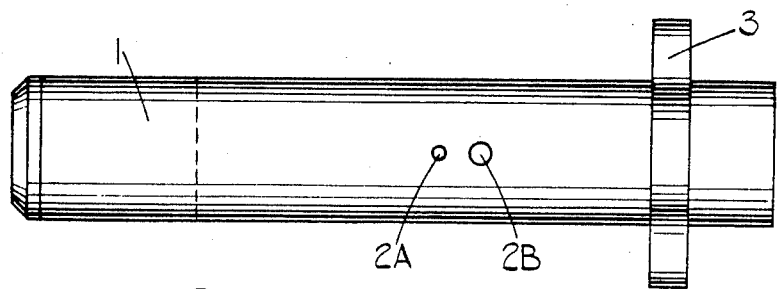
FIG. 1 is a plan view of one form of tube and flange assembly of the invention.
Figure 2:
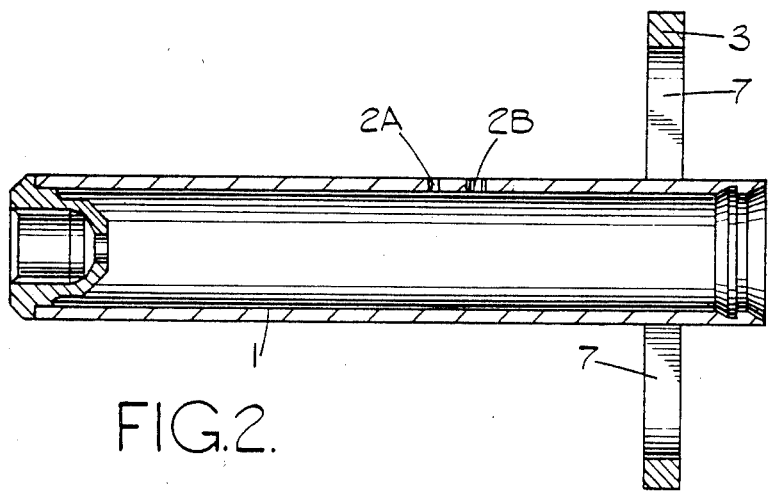
FIG. 2 is a longitudinal cross-section of the assembly of FIG. 1.
Figure 3:
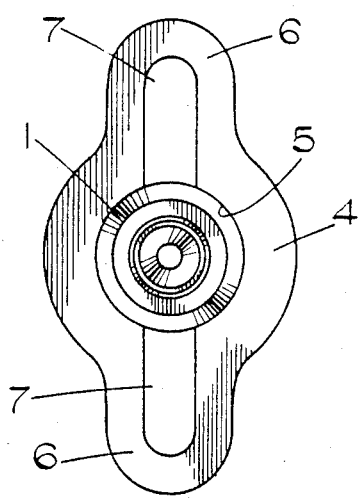
FIG. 3 is an end view of the assembly of FIGS. 1 and 2.

Referring to FIGS. 1 to 3 of the drawings, the tube and body assembly shown therein is in the form of a cylinder assembly intended for the attachment thereto of a reservoir (not shown) to form a master cylinder for use in a hydraulic system, such as a clutch or brake operating system of a motor vehicle for example. The reservoir would be attached, in use, to the cylinder 1 of the assembly and arranged so that ports of the reservoir register with holes 2A, 2B in the wall of the cylinder to permit the flow of hydraulic fluid between the reservoir and cylinder. The cylinder assembly is completed by the body in the form of a peripheral one-piece radially extending flange 3 secured to the cylinder by electron beam or laser welding, in the manner to be described.

As will be seen more clearly from FIG. 3, the flange 3 has a generally circular portion 4 which has a concentric circular aperture 5 to receive the cylinder 1. The flange 3 has a pair of diametrically opposed radially outwardly extending projections 6 containing a pair of opposed slots 7 which extend from the opening 5, into which they lead, to terminate close to the free ends of the projections. The primary purpose of the slots is to permit resilient deformation of the flange, and consequent slight expansion of the opening 5 to facilitate the passage therethrough of the cylinder 1 during assembly. The slots may also serve in the securing of the assembly to a support by permitting fixing screws or the like to pass through the flange into the support.

In accordance with the invention, the flange opening 5 has a diameter no greater than the smallest external diameter of the cylinder in the range of permitted manufacturing tolerances and may in fact be very slightly less than that external diameter. The flange is attached to the cylinder by deforming it outwardly, as permitted by the slots 7, to expand the opening 5 until it is large enough to permit the flange to be passed over the external surface of the cylinder and slide to a desired position therealong. When the flange is released, it resiliently recovers, tending to re-assume its original proportions, and resiliently grips the outer surface of the cylinder and is thereby retained in said position. The flange is thereafter welded to the cylinder by effecting an electron beam or laser welding operation to form either a plurality of spaced local welds, or preferably a continuous weld around the entire junction between the cylinder and flange.

As well as solving the problem of initial sizing of the cylinder, the gripping of the flange around the cylinder means that any tendency for the cylinder and flange to move apart as a result of stresses set up during welding will be thereby compensated for.

Figure 4:
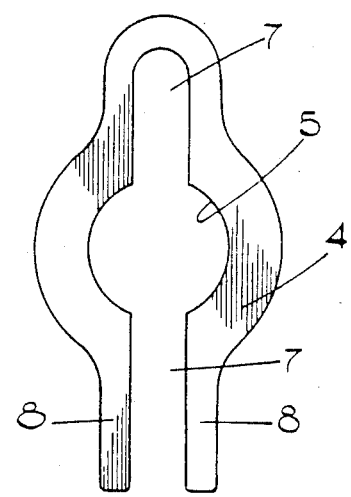
FIG. 4 illustrates an alternative form of body for use in the assembly of the invention.

FIG. 4 shows an alternative form of flange similar to that of FIG. 3 but in which one of the slots 7 has both of its ends open, thereby forming a pair of legs 8. This arrangement enables the opening 5 to be slightly larger than the external diameter of the tube at the desired position of location of the flange in the assembly and the flange is caused intimately to surround the tube by squeezing the legs 8 inwardly and, if desired, applying a clamping force to the legs by screw or other suitable means. The clamped flange can then be welded in position by the same means as before, and similar advantages are obtained. Again, the slots 7 may be dimensioned to receive fixing screws, or similar means, thereby obviating the necessity for extra holes for this purpose.

It will be understood that many forms of assembly comprising a tube and surrounding body may be formed by the method of the invention. One further example of such an assembly is a shock absorber cylinder provided with a body, which may again be a flange, to act as a spring abutment. The shapes of the tube and body may be varied as desired consistent with the body being capable of exerting an inward force on the tube either by inherent resilience thereof or by the application of external force. Examples of an alternative form of body are a collar or a boss.

The invention will be understood to embrace a tube and flange assembly made by the method described herein and in which the flange has a pair of generally opposed slots extending from the flange aperture outwardly towards the flange periphery.

Although laser or electron beam welding have been described herein as preferred, other forms of high energy density welding, such as plasma arc welding may be employed in carrying out the method of the invention.

I claim:

1. A method of producing a pressure cylinder assembly for use in an hydraulic master cylinder comprised of a metal tube and a flat plate-like mounting flange member attached to the tube, comprising the steps of forming in the flange member an opening which includes a part generally matching the external contour of the tube and being, when the flange member is unstressed, large enough to surround with clearance a portion of the external periphery of the tube at the position where the flange member is to be attached, said opening also including a slot extending outwardly from said matching part and being open at its end remote from said matching part and being arranged and dimensioned to permit contraction of said matching part by resilient deformation of the flange member by application of a force in the region of the slot, passing the tube through said opening part to a desired position of attachment to the tube, deforming the flange member by applying a force in the region of the slot to radially inwardly contract said matching part into engagement with the tube, holding said matching part in engagement with the tube, and securing the flange member in position by welding it to the metal tube during said holding step.

2. A method as claimed in claim 1 wherein said welding comprises high energy density welding.

3. The method as claimed in claim 2 wherein said welding comprises electron beam welding.

4. A method of producing a pressure cylinder assembly for use in an hydraulic master cylinder comprised of a metal tube and a flat plate-like mounting flange member attached to the tube, comprising the steps of:

forming in the flange member an opening which includes a part generally matching the external contour of the tube and being, when the flange member is unstressed, large enough to surround with clearance a portion of the external periphery of the tube at the position where the flange member is to be attached, said opening also including a first slot extending outwardly from said matching part and being open at its end remote from said matching part and being arranged and dimensioned to permit contraction of said matching part by resilient deformation of the flange member by application of a force in the region of said first slot;

forming a second slot extending substantially oppositely from the substantially opposite side of said matching part from said first slot and being closed at its end remote from the matching part;

passing the tube through said opening part to a desired position of attachment to the tube;

deforming the flange member by applying a force in the region of said first slot to radially inwardly contract said matching part into engagement with the tube; and securing the flange member in position by welding it to the metal tube.

* * * * *